(12) United States Patent
Nichols (10) Patent No.: US 9,507,026 B2
(45) Date of Patent: Nov. 29, 2016

(54) APPARATUS FOR VERIFIED ANTISPOOFING NAVIGATION

(71) Applicant: Trimble Navigation Limited, Sunnyvale, CA (US)

(72) Inventor: Mark E. Nichols, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 1018 days.

(21) Appl. No.: 13/887,302

(22) Filed: May 4, 2013

(65) Prior Publication Data

US 2016/0154112 A1    Jun. 2, 2016

(51) Int. Cl.
  *G01S 19/10* (2010.01)
  *G01S 19/21* (2010.01)

(52) U.S. Cl.
  CPC .............. *G01S 19/215* (2013.01); *G01S 19/10* (2013.01)

(58) Field of Classification Search
  CPC ...... G01S 19/10; G01S 19/215; G01S 19/45; G01S 19/47; G01S 19/48; G01S 19/49; G01S 19/06; G01S 19/07; G01S 19/20
  USPC .............. 342/357.47, 357.3, 357.32, 357.31, 342/357.28, 357.43, 357.44, 357.58
  See application file for complete search history.

(56) References Cited

U.S. PATENT DOCUMENTS

| | | | |
|---|---|---|---|
| 4,972,431 A | 11/1990 | Keegan | |
| 5,535,278 A | 7/1996 | Cahn et al. | |
| 6,047,258 A | 4/2000 | Allison et al. | |
| 6,232,874 B1 | 5/2001 | Murphy | |
| 6,933,885 B1 | 8/2005 | Stockmaster et al. | |
| 7,471,238 B2 | 12/2008 | Lillo et al. | |
| 7,738,884 B2 | 6/2010 | Cheung et al. | |
| 7,809,370 B2 | 10/2010 | Stolte et al. | |
| 2003/0068044 A1* | 4/2003 | Nikolsky | B64D 45/0015 380/258 |
| 2004/0107028 A1* | 6/2004 | Catalano | B64D 45/0015 701/2 |
| 2009/0254278 A1 | 10/2009 | Wang | |
| 2011/0127380 A1* | 6/2011 | Orgerie | B64D 11/0015 244/118.5 |
| 2011/0238307 A1* | 9/2011 | Psiaki | G01C 21/28 701/469 |
| 2013/0002477 A1 | 1/2013 | Dehnie | |
| 2014/0097984 A1* | 4/2014 | Stevens | G01S 19/20 342/357.58 |

FOREIGN PATENT DOCUMENTS

EP    2 397 868 A1    12/2011

OTHER PUBLICATIONS

Trinkle, Matthew et al: "GPS Anti-Spoofing Techniques for Smart Grid Applications", ION GNSS 2012, Sep. 21, 2012, pp. 1270-1278, Manassas, VA, USA.

* cited by examiner

*Primary Examiner* — Harry Liu
(74) *Attorney, Agent, or Firm* — Kilpatrick Townsend & Stockton LLP (57) ABSTRACT

A verified antispoofing navigation apparatus is provided. The apparatus comprises: a primary navigation receiver configured to provide a set of primary measurements related to positioning of a mobile platform; a supplemental navigation device configured to provide a set of supplemental measurements related to positioning of the mobile platform; an identity monitoring device configured to verify an identity of a driver of the mobile platform; and a verification and authentication navigation processor configured to verify authenticity of the set of primary measurements provided by the primary navigation receiver by using the set of supplemental measurements provided by the supplemental navigation device. The verified antispoofing navigation apparatus further comprises: a driver authentication navigation processor configured to provide the driving and rest times of the driver to relevant authorities.

19 Claims, 3 Drawing Sheets

APPARATUS FOR VERIFIED ANTISPOOFING NAVIGATION

TECHNICAL FIELD

The technology relates to authentication services, and more specifically to authentication services utilizing positioning from a GNSS source.

BACKGROUND

The Galileo commercial service is one part of the new services available from the Galileo portion of the European Global Navigation Satellite Systems (GNSS). In particular, features and services available from the Galileo system enable the development of GNSS based authentication applications encompassing the users' identity, positioning, velocity and timing.

Following the EU Directive 2004/52/EC GNSS based electronic tolling for highways is expanding in Europe. With the growing value associated with tolling using GNSS receivers various techniques are being developed to "play back" signals to create travel logs that indicate that the user is not on a specific toll route.

In particular, vulnerabilities in the system could enable undesirable manipulation of data, possibly leading to misleading results. Therefore there is a need for an added level of verification of obtained positioning information before it could be used for legitimate purposes.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A verified antispoofing navigation apparatus is provided. The apparatus comprises: a primary navigation receiver configured to provide a set of primary measurements related to positioning of a mobile platform; a supplemental navigation device configured to provide a set of supplemental measurements related to positioning of the mobile platform; an identity monitoring device configured to verify an identity of a driver of the mobile platform; and a verification and authentication navigation processor configured to verify authenticity of the set of primary measurements provided by the primary navigation receiver by using the set of supplemental measurements provided by the supplemental navigation device.

The verified antispoofing navigation apparatus further comprises: a driver authentication navigation processor configured to provide the driving and rest times of the driver to relevant authorities.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

The need for antispoofing navigation can be underscored by the following example. The drones that are used to survey the domestic populace, are easy to hijack. In fact, a determined individual can do it with less than $1,000 worth of equipment.

Indeed, in a report aired on Fox News, University of Texas at Austin Professor Todd Humphreys demonstrated how easy hijacking an unmanned drone can be. Using a device to "spoof" the navigation signal from the Global Positioning System, Humphreys and his team effectively took control of a small demonstration vehicle. The drone used in Humphrey's presentation was a small helicopter UAV, similar to the ShadowHawk. For reference, please follow the link: http://www.geekosystem.com/uav-gps-spoof/

'Spoofing a GPS receiver on a UAV is just another way of hijacking a plane,' Humphreys said. By sending out a signal that looks like GPS, Humphreys was able to trick the drone into a new set of commands.

It's worth noting that Humphreys works at the University's Radio navigation Laboratory and is uniquely suited to pull off such a feat. However, the low cost of Humphrey's spoofing device—which Russia Today described as "the most advanced one ever built"—suggests that this kind of device could be quickly and easily manufactured by even those who don't understand how it works.

The drawbacks of GPS have been known for a while, but the difficulty in replacing it with a new standard has yet to gain any real traction. As unnerving as law enforcement drones running out of control is, the fact that this same kind of attack could easily be done to any of the numerous GPS devices people interact with on a daily basis. The present application deals with this problem.

Figure 1:
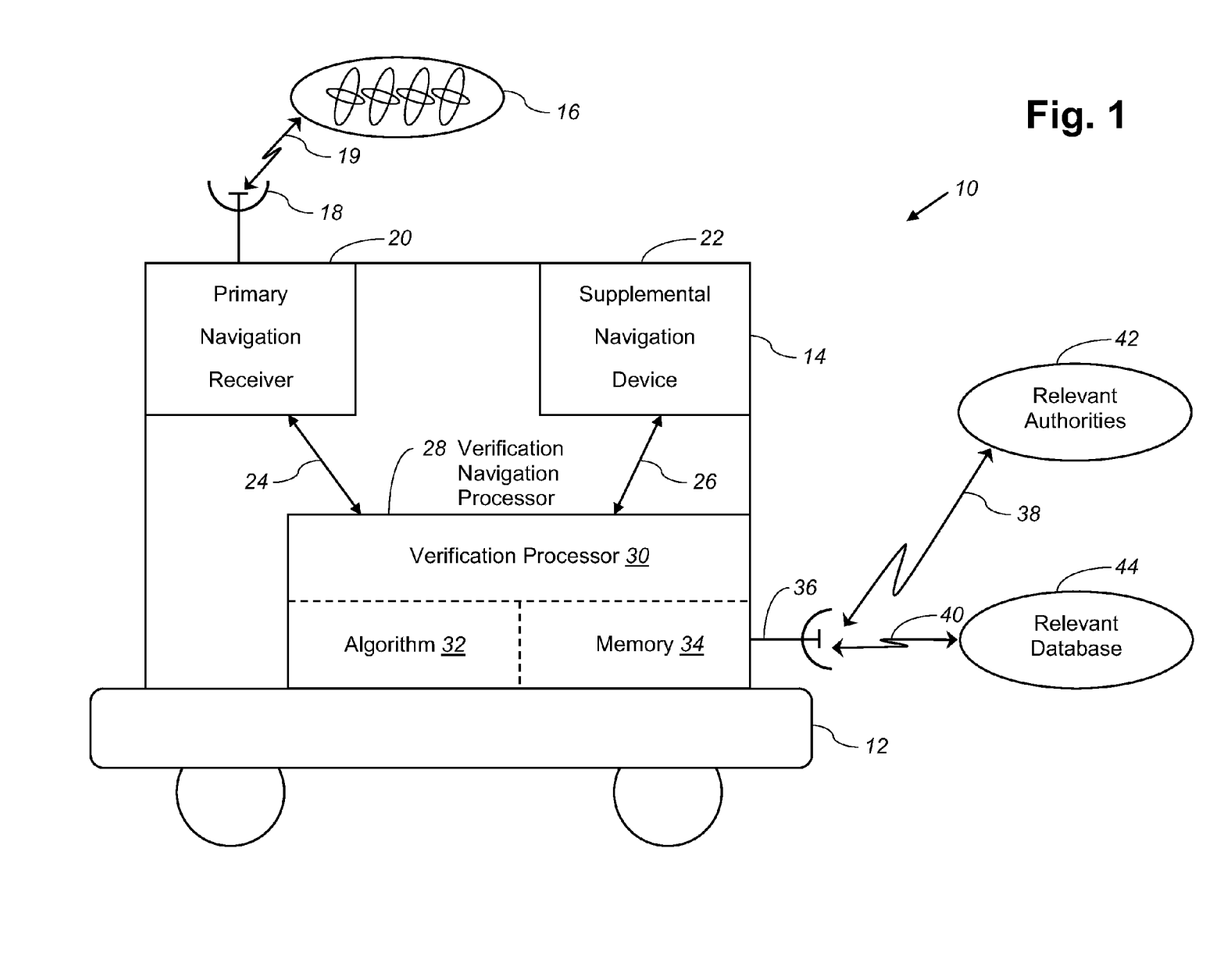
FIG. 1 depicts an apparatus for verified antispoofing navigation for the purposes of the present technology.

FIG. 1 is a block diagram 10 that illustrates an apparatus 14 for verified antispoofing navigation of a mobile platform 12 for the purposes of the present technology.

In the embodiment of the present technology, the mobile platform 12 is selected from the group consisting of land vehicles: a car, a truck, a train, a tractor and an earth moving vehicle.

in the embodiment of the present technology, the mobile platform 12 is selected from the group consisting of water vehicles: a boat, a yacht, and a water sport vehicle.

In the embodiment of the present technology, the mobile platform 12 is selected from the group consisting of flying platforms: a law enforcement drone, a military drone, a commercial drone, a sports plane, and a passenger plane.

In the embodiment of the present technology, the apparatus for verified antispoofing navigation 14 comprises: a primary navigation receiver 20, a supplemental navigation device 22, and a verification navigation processor 26

In an embodiment of the present technology, the primary navigation receiver 20 is configured to receive navigation signals 19 by using an antenna 18 from a radio positioning system 16.

In an embodiment of the present technology, the radio positioning system 16 is selected from the group consisting of: a Galileo navigation receiver; a GPS navigation receiver; a GLONASS navigation receiver; a Compass navigation receiver; a Quasi-Zenith Satellite System (QZSS) navigation receiver; a combined multi-satellite navigation receiver; and a pseudolite navigation receiver (including a Trimble Terralite and a Locata receiver).

In an embodiment of the present technology, the radio positioning system 18 can be implemented by using the Global Positioning System (GPS). The GPS is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

The GPS project was developed in 1973 to overcome the limitations of previous navigation systems, integrating ideas from several predecessors, including a number of classified engineering design studies from the 1960s. GPS was created and realized by the U.S. Department of Defense (DoD) and was originally run with 24 satellites. It became fully operational in 1994.

Advances in technology and new demands on the existing system have now led to efforts to modernize the GPS system and implement the next generation of GPS III satellites and Next Generation Operational Control System (OCX). Announcements from the Vice President and the White House in 1998 initiated these changes. In 2000, U.S. Congress authorized the modernization effort, referred to as GPS III.

In an embodiment of the present technology, the radio positioning system 18 can be implemented by using GLONASS or Global Navigation Satellite System. GLONASS is a radio-based satellite navigation system operated for the Russian government by the Russian Aerospace Defense Forces. It both complements and provides an alternative to the United States' Global Positioning System (GPS) and is the only alternative navigational system in operation with global coverage and of comparable precision.

Development of GLONASS began in the Soviet Union in 1976. Beginning on 12 Oct. 1982, numerous rockets launches added satellites to the system until the "constellation" was completed in 1995. During the 2000s, under Vladimir Putin's presidency, the restoration of the system was made a top government priority and funding was substantially increased. GLONASS is the most expensive program of the Russian Federal Space Agency, consuming a third of its budget in 2010.

By 2010, GLONASS had achieved 100% coverage of Russia's territory and in October 2011, the full orbital constellation of 24 satellites was restored, enabling full global coverage. The GLONASS satellites' designs have undergone several upgrades, with the latest version being GLONASS-K.

In an embodiment of the present technology, the radio positioning system 18 can be implemented by using Compass, or the BeiDou Navigation Satellite System (BDS). Compass is a Chinese satellite navigation system. It consists of two separate satellite constellations—a limited test system that has been operating since 2000, and a full-scale global navigation system that is currently under construction.

The first BeiDou system, officially called the BeiDou Satellite Navigation Experimental System and also known as BeiDou-1, consists of three satellites and offers limited coverage and applications. It has been offering navigation services, mainly for customers in China and neighboring regions, since 2000.

The second generation of the system officially called the BeiDou Satellite Navigation System (BDS) and also known as COMPASS or BeiDou-2, will be a global satellite navigation system consisting of 35 satellites, and is under construction as of January 2013. It became operational in China in December 2011, with 10 satellites in use, and began offering services to customers in the Asia-Pacific region in December 2012. It is planned to begin serving global customers upon its completion in 2020.

In an embodiment of the present technology, the radio positioning system 18 can be implemented by using the Quasi-Zenith Satellite System (QZSS). QZSS is a proposed three-satellite regional time transfer system and Satellite Based Augmentation System for the Global Positioning System, that would be receivable within Japan. The first satellite 'Michibiki' was launched on 11 Sep. 2010. Full operational status is expected by 2013. Authorized by the Japanese government in 2002, work on a concept for a Quasi-Zenith Satellite System (QZSS), began development by the Advanced Space Business Corporation (ASBC) team, including Mitsubishi Electric, Hitachi, and GNSS Technologies Inc. However, ASBC collapsed in 2007. The work was taken over by the Satellite Positioning Research and Application Center. SPAC is owned by four departments of the Japanese government: the Ministry of Education, Culture, Sports, Science and Technology, the Ministry of Internal Affairs and Communications, the Ministry of Economy, Trade and Industry, and the Ministry of Land, Infrastructure and Transport.

QZSS is targeted at mobile applications, to provide communications-based services (video, audio, and data) and positioning information. With regards to its positioning service, QZSS can only provide limited accuracy on its own and is not currently required in its specifications to work in a stand-alone mode. As such, it is viewed as a GNSS Augmentation service. Its positioning service could also collaborate with the geostationary satellites in Japan's Multi-Functional Transport Satellite (MTSAT), currently under development, which itself is a Satellite Based Augmentation System similar to the U.S. Federal Aviation Administration's Wide Area Augmentation System (WAAS).

In an embodiment of the present technology, the radio positioning system 18 can be implemented by using Galileo. Galileo is a global navigation satellite system (GNSS) currently being built by the European Union (EU) and European Space Agency (ESA). The €5 billion project is named after the Italian astronomer Galileo Galilei. One of the aims of Galileo is to provide a high-precision positioning system upon which European nations can rely, independently from the Russian GLONASS, US GPS, and Chinese Compass systems, which can be disabled in times of war or conflict.

When in operation, it will use two ground operations centers near Munich, Germany and in Fucino, Italy. In December 2010, EU ministers in Brussels voted Prague, Czech Republic as the headquarters of the Galileo project. On 21 Oct. 2011, the first two of four operational satellites were launched to validate the system. The next two followed on 12 Oct. 2012, making it "possible to test Galileo end-to-end". Once this In-Orbit Validation (IOV) phase has been completed, additional satellites will be launched to reach Initial Operational Capability (IOC) around mid-decade. Full completion of the 30-satellite Galileo system (27 operational and three active spares) is expected by 2019.

Basic navigation services will be free of charge. Galileo is intended to provide horizontal and vertical position measurements within 1 meter precision and better positioning services at high latitudes than other positioning systems. As a further feature, Galileo will provide a unique global search and rescue (SAR) function. Satellites will be equipped with a transponder which will relay distress signals from the user's transmitter to the Rescue Co-ordination Centre, which will then initiate the rescue operation. At the same time, the system will provide a signal to the users, informing them that their situation has been detected and that help is on the way. This latter feature is new and is considered a major upgrade compared to the existing GPS and GLONASS navigation systems, which do not provide feedback to the user.

The use of basic (low-precision) Galileo services will be free and open to everyone. The high-precision capabilities will be available for paying commercial users (please, see below: authenticated services based on commercial usage of E6 signals) and for military use.

In an embodiment of the present technology, the primary navigation receiver 20 is configured to receive the navigation signals from a combination of at least 4 visible satellites including a GPS satellite, and/or a Galileo satellite, and/or a GLONASS satellite, and/or a Compass satellite, and/or a Quasi-Zenith Satellite System (QZSS) satellite.

In an embodiment of the present technology, the radio positioning system 18 can be implemented by using a pseudolite. Pseudolite is a contraction of the term "pseudo-satellite," used to refer to something that is not a satellite which performs a function commonly in the domain of satellites. Pseudolites are most often small transceivers that are used to create a local, ground-based GPS alternative. The range of each transceiver's signal is dependent on the power available to the unit.

Being able to deploy one's own positioning system, independent of a radio satellite system, a pseudolite can be useful in situations where the normal satellite signals are either blocked/jammed (military conflicts), or simply not available (exploration of other planets).

In an embodiment of the present technology, the primary navigation receiver 20 is selected from the group consisting of: an autonomous GPS satellite navigation receiver; a differential GPS satellite navigation receiver; and an RTK GPS satellite navigation receiver.

In an embodiment of the present technology, the primary navigation receiver 20 (of FIG. 1) comprises a differential GPS satellite navigation receiver. In differential position determination, many of the errors in the Radio Positioning System (RADPS) signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS processor can include: (a) a real time code differential GPS; (b) a post-processing differential GPS; (c) a real-time kinematic (RTK) differential GPS that includes a code and carrier RTK differential GPS processor.

The differential GPS receiver can obtain the differential corrections from different sources. Referring still to FIG. 1, in an embodiment of the present technology, the differential corrections can be obtained from a Base Station (not shown).

The fixed Base Station (BS) placed at a known location determines the range and range-rate measurement errors in each received GPS signal and communicates these measurement errors as corrections to be applied by local users. The Base Station (BS) has its own imprecise clock with the clock bias CBBASE. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in an embodiment of the present technology, the primary navigation receiver 20 can be implemented by using a TRIMBLE Ag GPS-132 receiver that obtains the differential corrections from the U.S. Coast Guard service free in 300 kHz band broadcast by using the wireless communication device (not shown) and the wireless communication link (not shown). In this embodiment, the mobile radio positioning system receiver 12 should be placed within (2-300) miles from the U. S. Coast Guard Base Station. The accuracy of this differential GPS method is about 50 cm.

Referring still to FIG. 1, in an embodiment of the present technology, the differential corrections can be obtained from the Wide Area Augmentation System (WAAS). The WAAS system includes a network of Base Stations that uses satellites (initially geostationary satellites-GEOs) to broadcast GPS integrity and correction data to GPS users. The WAAS provides a ranging signal that augments the GPS, which is the WAAS ranging signal, is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is specified at 1.6 meters.

Referring still to FIG. 1, in an embodiment of the present technology, the primary navigation receiver 20 comprising differential GPS processor can obtain a differential GPS radio navigation receiver can obtain the differential corrections from the Virtual Base Station (VBS) (not shown radio navigation receiver) by using the wireless communication device (not shown) and the wireless communication link (not shown).

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location.

Referring still to FIG. 1, in an embodiment of the present technology, the primary navigation receiver 20 comprising a real time kinematic (RTK) differential GPS processor can obtain the position locations with less than 2 cm accuracy. RTK is a process where GPS signal corrections are transmitted in real time from a reference receiver at a known location to one or more remote rover receivers. The use of an RTK capable GPS system can compensate for atmospheric delay, orbital errors and other variables in GPS geometry, increasing positioning accuracy up to within a centimeter. Used by engineers, topographers, surveyors and other professionals, RTK is a technique employed in applications where precision is paramount. RTK is used, not only as a precision positioning instrument, but also as a core for navigation systems or automatic machine guidance, in applications such as civil engineering and dredging. It provides advantages over other traditional positioning and tracking methods, increasing productivity and accuracy. Using the code phase of GPS signals, as well as the carrier phase, which delivers the most accurate GPS information, RTK provides differential corrections to produce the most precise GPS positioning.

Referring still to FIG. 1, in an embodiment of the present technology, the primary navigation receiver 20 can be implemented by using a pseudolite. The pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability. The complete description of the pseudolite transmitters in GPS band can be found in "Global Positioning System: Theory and Applications"; Volume II, edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966. For the purposes of the present technology, the pseudolite manufactured by Locata (Canberra, Australia) and Novariant (Menlo Park, Calif.) can be used.

Referring still to FIG. 1, in an embodiment of the present technology, the primary navigation receiver 20 can be implemented by using TRE-G3T-E E6-band receiver that is capable of tracking E6 B/C signal from all launched Galileo satellites. E6 B/C signal can be used for real time authentication services depending on personal positioning, timing and velocity information.

Indeed, a real time verified navigation can be enabled by using the Commercial Service of the EC Galileo program.

However, the threats from hackers such as spoofing and meaconing (the interception and rebroadcast of navigation signals) need to be addressed to provide a real time verified antispoofing navigation.

Referring still to FIG. 1, in an embodiment of the present technology, the supplemental navigation device 22 is selected from the group consisting of: an Inertial Navigation System receiver, an accelerometer-based navigation receiver, a magnetometer-based navigation receiver, a cell phone-based navigation receiver, a Distance Measurement Instrument comprising an Internal Rim DMI sensor (for car-related applications), and a wheel rotating sensor (for car-related applications).

An inertial navigation system (INS) is a navigation aid that uses a computer, motion sensors (accelerometers) and rotation sensors (gyroscopes) to continuously calculate via dead reckoning the position, orientation, and velocity (direction and speed of movement) of a moving object without the need for external references. It is used on vehicles such as ships, aircraft, submarines, guided missiles, and spacecraft. Other terms used to refer to inertial navigation systems or closely related devices include inertial guidance system, inertial reference platform, inertial instrument, inertial measurement unit (IMU) and many other variations.

An inertial navigation system includes at least a computer and a platform or module containing accelerometers, gyroscopes, or other motion-sensing devices. The INS is initially provided with its position and velocity from another source (a human operator, a GPS satellite receiver, etc.), and thereafter computes its own updated position and velocity by integrating information received from the motion sensors. The advantage of an INS is that it requires no external references in order to determine its position, orientation, or velocity once it has been initialized.

An INS can detect a change in its geographic position (a move east or north, for example), a change in its velocity (speed and direction of movement), and a change in its orientation (rotation about an axis). It does this by measuring the linear and angular accelerations applied to the system. Since it requires no external reference (after initialization), it is immune to jamming and deception.

Referring still to FIG. 1, in an embodiment of the present technology, the supplemental navigation device 22 is implemented by using an inertial navigation system (INS) configured to detect the spoofing of the primary navigation receiver 20 as discussed in details below.

Referring still to FIG. 1, in an embodiment of the present technology, the supplemental navigation device 22 is implemented by using a plurality of gyroscopes and accelerometers and a processor.

A gyroscope is configured to measure the angular velocity of the system in the inertial reference frame. By using the original orientation of the system in the inertial reference frame as the initial condition and integrating the angular velocity, the system's current orientation is known at all times. This can be thought of as the ability of a blindfolded passenger in a car to feel the car turn left and right or tilt up and down as the car ascends or descends hills. Based on this information alone, the passenger knows what direction the car is facing but not how fast or slow it is moving, or whether it is sliding sideways.

Accelerometers measure the linear acceleration of the system in the inertial reference frame, but in directions that can only be measured relative to the moving system (since the accelerometers are fixed to the system and rotate with the system, but are not aware of their own orientation). This can be thought of as the ability of a blindfolded passenger in a car to feel themselves pressed back into their seat as the vehicle accelerates forward or pulled forward as it slows down; and feel themselves pressed down into their seat as the vehicle accelerates up a hill or rise up out of their seat as the car passes over the crest of a hill and begins to descend. Based on this information alone, they know how the vehicle is accelerating relative to itself, that is, whether it is accelerating forward, backward, left, right, up (toward the car's ceiling), or down (toward the car's floor) measured relative to the car, but not the direction relative to the Earth, since they did not know what direction the car was facing relative to the Earth when they felt the accelerations.

However, by tracking both the current angular velocity of the system and the current linear acceleration of the system measured relative to the moving system, it is possible to determine the linear acceleration of the system in the inertial reference frame. Performing integration on the inertial accelerations (using the original velocity as the initial conditions) using the correct kinematic equations yields the inertial velocities of the system, and integration again (using the original position as the initial condition) yields the inertial position. In our example, if the blindfolded passenger knew how the car was pointed and what its velocity was before he was blindfolded, and if they are able to keep track of both how the car has turned and how it has accelerated and decelerated since, they can accurately know the current orientation, position, and velocity of the car at any time.

Referring still to FIG. 1, in an embodiment of the present technology, the supplemental navigation device 22 can be implemented by using at least three accelerometers if location of the mobile platform 12 is determined independently by using, for example, other means, like a triangulation method.

Indeed, an accelerometer is a sensor that mathematically determines acceleration over time by measuring the speed and by using a known distance. In an embodiment of the present technology, acceleration of the mobile platform 12 may be measured in each of three perpendicular directions corresponding to the x, y, and z-axes of a Cartesian coordinate system by using three accelerometers. The location of the mobile platform can be further obtained by using at least three radio signals transmitted from at least three radio towers.

Two or three accelerometers can be mounted orthogonal to one another and can be used to measure the longitudinal acceleration axis and lateral acceleration axis. The tangential or longitudinal axis acceleration is integrated once to obtain longitudinal speed and is integrated again to produce a relative displacement. The lateral accelerometer measures the centripetal force which is used to compute a centripetal or lateral acceleration. The lateral acceleration is used to obtain a heading change derived from the lateral acceleration information and the longitudinal speed. Using the heading change and the longitudinal acceleration, the improved navigation system propagates a previous position of the mobile platform 12 to a current position of the mobile platform 12. The third accelerometer provides pitch to assist in calibrating the other accelerometers or other sensors and in altering the longitudinal and/or lateral acceleration information.

In an embodiment of the present technology, accelerations of the mobile platform 12 may be measured for six degrees-of-freedom by using a number of accelerometers, wherein three accelerations may be measured corresponding to the x, y, and z-axes of a Cartesian coordinate system, and wherein three additional accelerations may be measured corresponding to pitch, roll, and rotation.

In an embodiment of the present technology, at least one accelerometer employed by the supplemental navigation device 22 can be implemented by using a relatively inexpensive (~5) and having a relatively high resolution (50 micro gravities per root hertz) accelerometer based on silicon-micro machined MEMS technology. This device exploits the changes in capacitance caused by the relative movement of moving and fixed structures created in the silicon, using wafer-processing techniques.

STMicroelectronics (NYSE: STM) manufactures a MEMS-based three-axis accelerometer device LIS3L02D that provides both three-axis sensing in a single package and a digital output. This device is designed primarily for handheld terminals where it can be used to implement a motion-based user interface that is based on hand movements, allowing one-handed operation without styli, thumb keyboards or other input devices. The LIS3L02D includes a single-chip MEMS sensor chip plus a calibrated interface chip that senses changes in capacitance in the sensor and translates them into SPI or I2C serial digital outputs. The LIS3L02D operates on a 2.7 to 3.6 V supply voltage. The device has an equivalent noise acceleration of better than 500 millionths of one 'g'. During transport and service it can withstand accelerations up to 3000 g without damage.

Most micromechanical accelerometers operate in-plane, that is, they are designed to be sensitive only to a direction in the plane of the die. By integrating two devices perpendicularly on a single die a two-axis accelerometer can be made. By adding an additional out-of-plane device three axes can be measured. Such a combination may have much lower misalignment error than three discrete models combined after packaging.

Micromechanical accelerometers are available in a wide variety of measuring ranges, reaching up to thousands of g's. The designer must make a compromise between sensitivity and the maximum acceleration that can be measured.

In an embodiment of the present technology, the absolute location of the mobile platform can be obtained by using the supplemental navigation device 22 comprising a cell phone and a triangulation correlation processor (not shown).

Mobile positioning, which includes location based service that discloses the actual coordinates of a mobile phone bearer, is a technology used by telecommunication companies to approximate where a mobile phone, and thereby also its user (bearer), temporarily resides. The more properly applied term locating refers to the purpose rather than a positioning process. Such service is offered as an option of the class of location-based services (LBS).

Mobile phone tracking refers to the attaining of the current position of a mobile phone, stationary or moving. Localization may occur either via triangulation of radio signals between (several) radio towers of the network and the phone. To locate the smart phone using triangulation of radio signals, it must emit at least the roaming signal to contact the next nearby antenna tower, but the process does not require an active call. GSM is based on the signal strength to nearby antenna masts.

The technology of locating is based on measuring power levels and antenna patterns and uses the concept that a powered mobile phone always communicates wirelessly with one of the closest base stations, so knowledge of the location of the base station implies the cell phone is nearby.

Advanced systems determine the sector in which the mobile phone is located and roughly estimate also the distance to the base station. Further approximation can be done by interpolating signals between adjacent antenna towers. Qualified services may achieve a precision of down to 50 meters in urban areas where mobile traffic and density of antenna towers (base stations) is sufficiently high. Rural and desolate areas may see miles between base stations and therefore determine locations less precisely.

GSM localization is the use of triangulation to determine the location of GSM mobile phones, or dedicated trackers, usually with the intent to locate the user. Localization-Based Systems can be broadly divided into: (i) network-based; (ii) handset-based; and (iii) SIM-based.

In order to route calls to a phone, the cell towers listen for a signal sent from the phone and negotiate which tower is best able to communicate with the phone. As the phone changes location, the antenna towers monitor the signal, and the phone is roamed to an adjacent tower as appropriate. By comparing the relative signal strength from multiple antenna towers, a general location of a phone can be roughly determined. Other means make use of the antenna pattern, which supports angular determination and phase discrimination.

Referring still to FIG. 1, in an embodiment of the present technology, the supplemental navigation device 22 can be implemented by using a Distance Measurement Instrument comprising an Internal Rim DMI sensor.

For example, manufactured by Trimble Ltd. Trimble Internal Rim DMI for AP GNSS-Inertial OEM Systems uses robust inductive proximity-sensing technology to provide consistent and accurate velocity information for the constraint of inertial errors and improved overall navigation performance in terrestrial applications. Internal Rim DMI is installed within the wheel well and does not protrude from the vehicle.

Polyurethane strip with embedded ferrous material targets is adhesive-backed for installation on inside of vehicle's wheel rim. Non-contact proximity sensor generates quadrature signal as the wheel turns. The Internal Rim DMI is ideal for permanent installation where preventing protrusions from vehicle's exterior is desirable. Proximity-sensing technology allows for reliable velocity determination at all speeds with no dead-band effects.

Referring still to FIG. 1, in an embodiment of the present technology, if the mobile platform comprises a land vehicle, the supplemental navigation device 22 can be implemented by using a wheel rotating sensor (a wheel speed sensor).

A wheel speed sensor or vehicle speed sensor (VSS) is a type of tachograph (Please, see discussion below). It is a sender device used for reading the speed of a vehicle's wheel rotation. It usually consists of a toothed ring and pickup.

In land-based vehicles, wheel speed sensors are used in anti-lock braking systems.

Many of the subsystems in a rail vehicle, such as a locomotive or multiple units, depend on a reliable and precise rotary speed signal, in some cases as a measure of the speed or changes in the speed. This applies in particular to traction control, but also to wheel slide protection, registration, train control, door control and so on. These tasks are performed by a number of rotary speed sensors that may be found in various parts of the vehicle.

Although rail vehicles occasionally do use drives without sensors, most need a rotary speed sensor for their regulator system. The most common type is a two-channel sensor that scans a toothed wheel on the motor shaft or gearbox and therefore does not require a bearing of its own. The target wheel can be provided especially for this purpose or may be already present in the drive system.

Referring still to FIG. 1, in an embodiment of the present technology, as was discussed above, the supplemental navigation device 22 is configured to obtain a set of motion-related data associated with the mobile platform 12 including the acceleration, velocity, and absolute location, that is immune to spoofing. This set of data is used in the present technology to enable verified antispoofing navigation of the mobile platform, as fully disclosed below.

Referring still to FIG. 1, in an embodiment of the present technology, the verification navigation processor 26 is configured to verify authenticity of a set of primary measurements provided by the primary navigation receiver 20 by using a set of supplemental measurements provided by the supplemental navigation device 22. The verification navigation processor 26 comprises a verification processor 30, an algorithm 32, and a memory block 34.

Referring still to FIG. 1, in an embodiment of the present technology, the verification processor 30 is implemented by using a general purpose processor or by using an ASIC (Application Specific Integrated Circuit).

Referring still to FIG. 1, in an embodiment of the present technology, the algorithm 32 is configured to combine a set of primary measurements (the flow of the set of primary measurements is indicated by arrow 24) provided by the primary navigation receiver 20 and a set of supplemental measurements (the flow of the set of supplemental measurements is indicated by arrow 26) provided by the supplemental navigation device 22 in a blended solution to provide to relevant authorities 42 an output combined positioning signal 38 (using antenna 36) related to positioning of the mobile platform 12.

Referring still to FIG. 1, in an embodiment of the present technology, the algorithm 32 is configured to run an integrity process comprising at least the following steps: (A) calculating a primary set of changes in position and direction of the mobile platform 12 by using the set of primary measurements 24 provided by the primary navigation receiver 20; (B) calculating a supplemental set of changes in position and direction of the mobile platform 12 by using the set of supplemental measurements 26 provided by the supplemental navigation device 22; (C) comparing the primary set of changes in position and direction of the mobile platform 12 and the supplemental set of changes in position and direction of the mobile platform 12 and obtaining a set of differences in position and direction of the mobile platform 12; (D) selecting in the set of differences in position and direction of the mobile platform a subset of critical differences in position and direction of the mobile platform elements; wherein each critical difference in position and direction of the mobile platform exceeds a first predetermined threshold; (E) if number of the critical differences exceeds a second predetermined threshold, detecting a spoofing message; and (F) communicating to relevant authorities 42 the detected spoofing message 38; wherein the spoofing message 38 informs relevant authorities that the primary navigation receiver 20 is compromised and does not provide the true positioning data of the mobile platform 12.

Example I

The Mobile Platform 12 is a Race Car

The race is in a difficult terrain like in a Dakar Rally. The Dakar Rally (or simply "The Dakar"; formerly known as "The Paris-Dakar" or "Paris to Dakar Rally") is an annual Dakar Series rally raid type of off-road race, organized by the Amaury Sport Organization. Most events since the inception in 1978 were from Paris, France, to Dakar, Senegal, but due to security threats in Mauritania, which led to the cancellation of the 2008 rally, the 2009 Dakar Rally was run in South America (Argentina and Chile). It was the first time the race took place outside of Europe and Africa. It has stayed in South America from 2009 to the present (2013)

The race is open to amateur and professional entries. Amateurs typically make up about eighty percent of the participants.

Despite its 'rally' name, it is an off-road endurance race, properly called a rally raid rather than a conventional rally. The terrain that the competitors traverse is much tougher and the vehicles used are true off-road vehicles rather than the modified on-road vehicles used in rallies. Most of the competitive special sections are off-road, crossing dunes, mud, camel grass, rocks among others. The distances of each stage covered vary from short distances up to 800-900 kilometers (500-560 mi) per day.

Under the circumstances of this type of competition, a driver can be induced to avoid the especially difficult part of the terrain and instead drive on an easier road. To avoid suspension, a driver could install the spoofing system in his car that would transmit to relevant authorities 42 the assumed location of the car, whereas the actual location of the car is quite different.

If this car on this Rally is equipped with the apparatus for verified antispoofing navigation 14 of the present technology, the fraudulent behavior of such car will be detected.

Indeed, let us select the primary navigation receiver 20 to be implemented by using a Galileo Commercial Services (Galileo CS) E6 frequency signals satellite receiver. Let us also select the supplemental navigation device 22 from the group consisting of: an Inertial Navigation System receiver; an accelerometer-based navigation receiver; a magnetometer-based navigation receiver; a cell phone-based navigation receiver; a Distance Measurement Instrument comprising an Internal Rim DMI sensor; and a wheel rotating sensor. Any of these devices is immune to spoofing radio signals and can accurately determine the true position of the race car.

The issues are: (i) how to define the critical difference (the first predetermined threshold); and (ii) what is the critical number of the critical differences (the second predetermined threshold)? All these values are arbitrary and can be pre-installed in the algorithm 32 of the apparatus 14 of the present technology by the Rally Organizers as a condition of participation in the Rally.

Example II

The Mobile Platform 12 is a Car Trying to Spoof its Location to Avoid Paying Tolls while Travelling on a Private Road Let us imagine that there are two roads between points A and B. The first road is a new toll-road (with a toll booth at each exit) in a very good condition, with pervious enhanced porosity concrete that can effectively capture and store storm water runoff, thereby allowing the runoff to percolate into the ground. This road is the safest highway to travel in a poor (rainy and/or snowy) weather. The second road is a free road with an old concrete cover that does not capture nor does it store the storm water. It is a very slippery and dangerous road, but it is a free road.

Let us further imagine that a dishonest driver would like to use the toll road but does not want to pay the toll at the exit of the road. The toll-payment system is automatic and each car travelling on this road uses the Galileo navigation receiver to determine its position coordinates and to transmit this information to the toll-paying system.

A dishonest driver can install a spoofing receiver that would transmit to the payment system the position of the car as it were travelling of a free road and thus escaping being charge a toll payment.

If this car is equipped with the apparatus for verified antispoofing navigation 14 of the present technology, this kind of fraud will be detected.

Indeed, let us select the primary navigation receiver 20 to be implemented by using a Galileo Commercial Services (Galileo CS) E6 frequency signals satellite receiver. Let us also select the supplemental navigation device 22 from the group consisting of: an Inertial Navigation System receiver; an accelerometer-based navigation receiver; a magnetometer-based navigation receiver; a cell phone-based navigation receiver; a Distance Measurement Instrument comprising an Internal Rim DMI sensor; and a wheel rotating sensor. Any of these devices is immune to spoofing radio signals and can accurately determine the true position of the car.

The issues are the same: (i) how to define the critical difference (the first predetermined threshold); and (ii) what is the critical number of the critical differences (the second predetermined threshold)?

All these values depending on the topology of these two roads connecting two points A and B can be pre-installed in the algorithm 32 of the apparatus 14 of the present technology by the toll road administration as a pre-condition of using the toll road.

Example III

The Mobile Platform 12 is a Yacht Trying to Spoof its Location to Win a Yacht Racing Yacht racing is a form of sport reserved for sailing vessels of substantial size and weight. The phrase yacht racing typically refers to racing of large and often expensive vessels crewed by professional sailors, as opposed to the more generic term sailboat racing which can include small vessels, dinghies and light craft.

As yacht racing became more prevalent, and yacht design more diverse, it was necessary to establish systems of measurements and time allowances due to the differences in boat design. Longer yachts are inherently faster than shorter ones; therefore, in the interests of fairness, in the 1820s a "primitive system of time allowance was introduced on the Solent." Larger yachts were handicapped; but owners with the biggest vessels had a problem with the allowance system, for they preferred that crossing the finish line first, much as in foot and horse races, should suffice to win the contest. As a result both ratings and "one-design" competition were developed.

Ratings systems rely upon some formulaic analysis of usually very specific yacht-design parameters such as length, sail area, displacement, and hull shape. During the 1920s and through the 1970s the Cruising Club of America established a formula by which most racing/cruising boats were designed during that period. After its descendant, the mathematically complex International Offshore Rule (IOR) of the 1970s, contributed to much decreased seaworthiness (and even speed), the simpler Performance Handicap Racing Fleet (PHRF) system was adopted. The PHRF uses only proven performance characteristics, especially theoretical sailing speed, as a means to allow dissimilar yachts—typically crewed by friends and families at clubs rather than by professional crews—to race together. Most popular family-oriented cruising sailboats will have a rating filed with a local chapter of the PHRF.

One-design racing is conducted with classes of similar boats, all built—often via mass-production—to the same design, so that crew ability and tactical expertise are more likely to decide a race than boat type or even weather.

In general, modern yacht-racing contests are conducted according to the Racing Rules of Sailing, first established in 1928. Though complex, the RRS are intended primarily simply ensure fairness and safety. The Rules are revised and updated every four years by the International Sailing Federation.

The major races of today can be classified as offshore, ocean, around the world, and inshore racing all adhering to one set of rule, but diverse handicapping standards.

Let us focus on Offshore racing Fastnet—established in 1924 with 7 boats, the race covers approximately 600 miles starting at Cowes on the Isle of Wight, rounding Fastnet rock on the southern coast of Ireland, and finishing at Plymouth.

Let us assume that one yachtsman decided to win this race by using a spoofing device that would transmit to the authorities that his yacht had rounded the Fastnet rock on the southern coast of Ireland, but in reality the yacht had not rounded the Fastnet rock to save the time and to win the race.

If this yacht is equipped with the apparatus for verified antispoofing navigation 14 of the present technology, this kind of fraud will be detected.

Indeed, let us select the primary navigation receiver 20 to be implemented by using a Galileo Commercial Services (Galileo CS) E6 frequency signals satellite receiver.

Let us also select the supplemental navigation device 22 from the group consisting of: an Inertial Navigation System receiver; an accelerometer-based navigation receiver; and a magnetometer-based navigation receiver. Any of these devices is immune to spoofing radio signals and can accurately determine the true position of the yacht.

The issues are the same: (i) how to define the critical difference (the first predetermined threshold); and (ii) what is the critical number of the critical differences (the second predetermined threshold)?

All these values depending on the topology of this race can be pre-installed in the algorithm 32 of the apparatus 14 of the present technology by the yacht race administration as a pre-condition of participating in the race.

Example IV

The Mobile Platform 12 is a Passenger Plane and the Spoofing Signal was Generated by a Smart Phone of a Security Researcher Demonstrating at the Security Summit in Amsterdam how Easy it is to Take Over the Plane A presentation at the Hack In The Box security summit in Amsterdam on Apr. 11, 2013, has demonstrated that it's possible to take control of aircraft flight systems and communications using an Android smartphone and some specialized attack code.

Hugo Teso, a security researcher at N.Runs and a commercial airline pilot, spent three years developing the code, buying second-hand commercial flight system software and hardware online and finding vulnerabilities within it.

Teso's attack code, dubbed SIMON, along with an Android app called PlaneSploit, can take full control of flight systems and the pilot's displays. The hacked aircraft could even be controlled using a smartphone's accelerometer to vary its course and speed by moving the handset about.

"You can use this system to modify approximately everything related to the navigation of the plane," Teso told Forbes. "That includes a lot of nasty things."

First, Teso looked at the Automatic Dependent Surveillance-Broadcast (ADS-B) system that updates ground controllers on an aircraft's position over a 1 Mb/s data link. This has no security at all, he found, and could be used to passively eavesdrop on an aircraft's communications and also actively interrupt broadcasts or feed in misinformation.

Also vulnerable is the Aircraft Communications Addressing and Reporting System (ACARS), the communication relay used between pilots and ground controllers. Using a Samsung Galaxy handset, he demonstrated how to use ACARS to redirect an aircraft's navigation systems to different map coordinates. "ACARS has no security at all. The airplane has no means to know if the messages it receives are valid or not," he said. "So they accept them and you can use them to upload data to the airplane that triggers these vulnerabilities. And then it's game over."

Teso was also able to use flaws in ACARS to insert code into a virtual aircraft's Flight Management System. By running the code between the aircraft's computer unit and the pilot's display he was able to take control of what the aircrew would be seeing in the cockpit and change the direction, altitude, and speed of the compromised craft.

He admitted that some of this was moot, given that the human pilot could always override the automatic systems, but the software could be used to make cockpit displays go haywire or control other functions, like deploying oxygen masks or lights.

The precise nature of the code flaws wasn't released—for understandable reasons—but Teso says the Federal Aviation Administration and the European Aviation Safety Administration have both been informed and are working on fixing the issue.

If this plane is equipped with the apparatus for verified anti-spoofing navigation 14 of the present technology, the pilot would be able to differentiate between the true navigational signals and spoofing signals originated by a passenger having a properly encoded smartphone.

Indeed, let us select the primary navigation receiver 20 to be implemented by using a Galileo Commercial Services (Galileo CS) E6 frequency signals satellite receiver. Let us also select the supplemental navigation device 22 from the group consisting of: an Inertial Navigation System receiver; an accelerometer-based navigation receiver; a magnetometer-based navigation receiver; and a cell phone-based navigation receiver. Any of these devices is immune to spoofing radio signals and can accurately determine the true position of the plane.

The issues are: (i) how to define the critical difference (the first predetermined threshold); and (ii) what is the critical number of the critical differences (the second predetermined threshold)? All these values are arbitrary and can be pre-installed in the algorithm 32 of the apparatus 14 of the present technology by the aviation administration as a condition of flying the plane.

Figure 2:
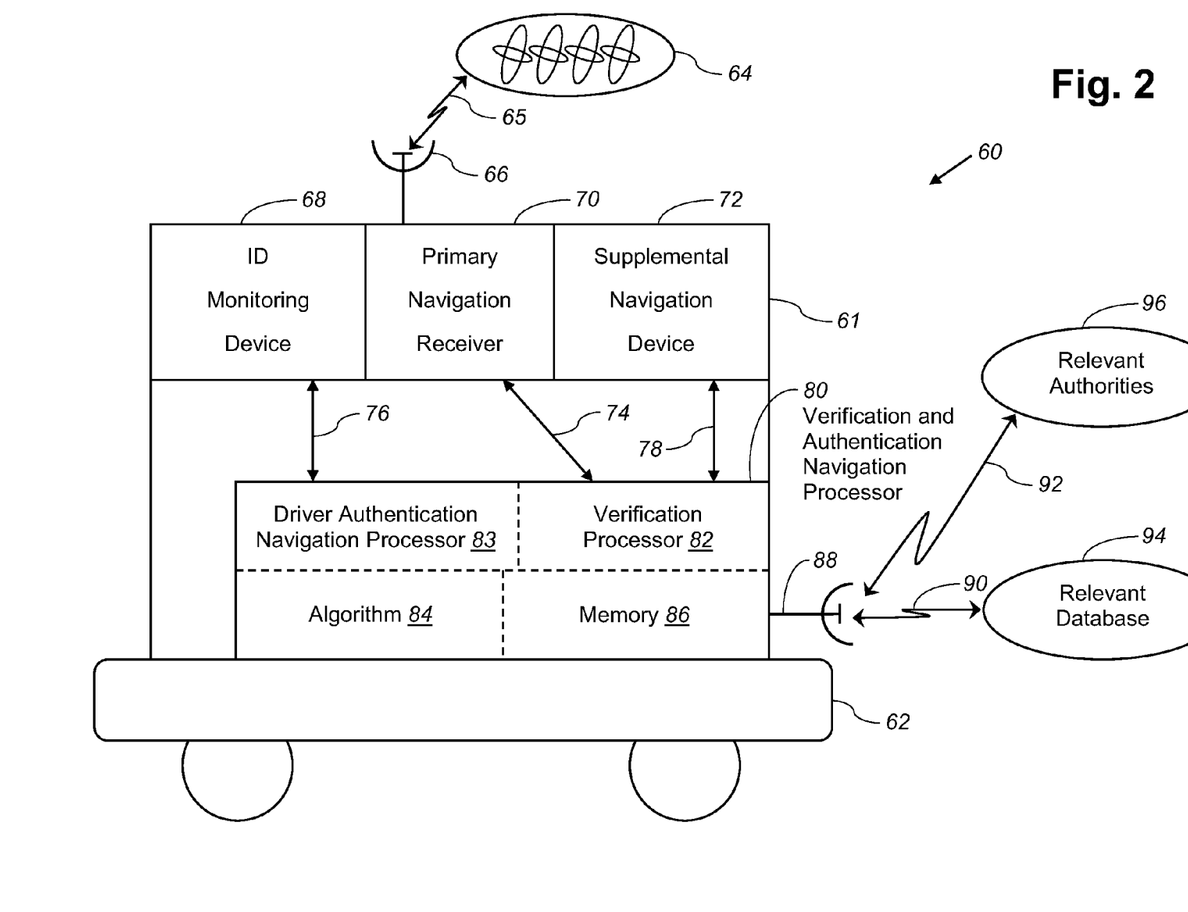
FIG. 2 illustrates an apparatus for authenticated verified antispoofing navigation for the purposes of the present technology.

In an embodiment of the present technology, FIG. 2 illustrates an apparatus 61 for authenticated verified anti-spoofing navigation.

In the embodiment of the present technology, the mobile platform 62 is selected from the group consisting of land vehicles: a car, a truck, a train, and an earth moving vehicle.

in the embodiment of the present technology, the mobile platform 62 is selected from the group consisting of water vehicles: a boat, a yacht, a water sport vehicle.

In the embodiment of the present technology, the mobile platform 62 is selected from the group consisting of flying platforms: a law enforcement drone, a military drone, a sports plane, and a passenger plane.

In the embodiment of the present technology, the apparatus for verified antispoofing navigation 61 comprises: a primary navigation receiver 70, a supplemental navigation device 72, an ID monitoring device 68, and a verification and authentication navigation processor 80.

In an embodiment of the present technology, the primary navigation receiver 70 is configured to receive navigation signals 65 by using an antenna 66 from a radio positioning system 64.

In an embodiment of the present technology, the radio positioning system 64 is selected from the group consisting of: a Galileo navigation receiver; a GPS navigation receiver; a GLONASS navigation receiver; a Compass navigation receiver; a Quasi-Zenith Satellite System (QZSS) navigation receiver; a combined multi-satellite navigation receiver; and a pseudolite navigation receiver. Please, see the detailed discussion above.

Referring still to FIG. 2, in an embodiment of the present technology, the supplemental navigation device 72 is selected from the group consisting of: an Inertial Navigation System receiver, an accelerometer-based navigation receiver, a magnetometer-based navigation receiver, a cell phone-based navigation receiver, a Distance Measurement Instrument comprising an Internal Rim DMI sensor (for car-related applications), and a wheel rotating sensor (for car-related applications). The detailed description of all modalities of these supplemental navigation devices were given above.

Referring still to FIG. 2, in an embodiment of the present technology, as was discussed above, the supplemental navigation device 72 is configured to obtain a set of motion-related data associated with the mobile platform 62 including the acceleration, velocity, and absolute location, that is immune to spoofing. This set of data is used in the present technology to enable verified antispoofing navigation of the mobile platform.

Referring still to FIG. 2, in an embodiment of the present technology, the verification processor 82, including an algorithm 84, and a memory block 86, is configured to verify authenticity of a set of primary measurements provided by the primary navigation receiver 79 and by using a set of supplemental measurements provided by the supplemental navigation device 72.

Referring still to FIG. 2, in an embodiment of the present technology, the verification processor 82 is implemented by using a general purpose processor or by using an ASIC (Application Specific Integrated Circuit).

Referring still to FIG. 2, in an embodiment of the present technology, the algorithm 84 is configured to combine a set of primary measurements (the flow of the set of primary measurements is indicated by arrow 74) provided by the primary navigation receiver 70 and a set of supplemental measurements (the flow of the set of supplemental measurements is indicated by arrow 78) provided by the supplemental navigation device 72 in a blended solution to provide to relevant authorities 96 an output combined positioning signal 92 (using antenna 88) related to positioning of the mobile platform 62.

Referring still to FIG. 2, in an embodiment of the present technology, the algorithm 84 is configured to run an integrity process comprising at least the following steps: (A) calculating a primary set of changes in position and direction of the mobile platform 62 by using the set of primary measurements 74 provided by the primary navigation receiver 70; (B) calculating a supplemental set of changes in position and direction of the mobile platform 62 by using the set of supplemental measurements 78 provided by the supplemental navigation device 72; (C) comparing the primary set of changes in position and direction of the mobile platform 62 and the supplemental set of changes in position and direction of the mobile platform 62 and obtaining a set of differences in position and direction of the mobile platform 62; (D) selecting in the set of differences in position and direction of the mobile platform a subset of critical differences in position and direction of the mobile platform elements; wherein each critical difference in position and direction of the mobile platform exceeds a first predetermined threshold; (E) if number of the critical differences exceeds a second predetermined threshold, detecting a spoofing message; and (F) communicating to relevant authorities 96 the detected spoofing message 92; wherein the spoofing message 92 informs relevant authorities that the primary navigation receiver 70 is compromised and does not provide the true positioning data of the mobile platform 62.

As was discussed above in details, definitions of the critical difference (the first predetermined threshold) and of the critical number of the critical differences (the second predetermined threshold) strongly depends on applications and should be pre-installed into algorithm 84 by the relevant authorities 94.

Referring still to FIG. 2, in an embodiment of the present technology, the apparatus 61 for authenticated verified antispoofing navigation further comprises an identity monitoring device 68 configured to verify identity of a driver of the mobile platform by using a plurality of id parameters selected from the group consisting of: a set of fingerprints; a set of eye scans; a photo identification; and a voice identification.

Referring still to FIG. 2, in an embodiment of the present technology, the identity monitoring device 68 includes a live scan fingerprinting apparatus (not shown) that is configured to capture fingerprints and palm prints of the driver of the mobile platform 62 electronically, without the need for the more traditional method of ink and paper.

In this embodiment of the present technology, the live scan fingerprinting apparatus inputs the obtained images of the fingerprints into the driver authentication navigation processor 83. The driver authentication navigation processor 83 can be implemented by using an Application Specific Integrated Circuit (ASIC).

In an embodiment of the present technology, the obtained images of the fingerprints can be checked against the relevant database 94 to make sure that the driver has no criminal record, if the criminal record is relevant for the purposes of using the apparatus 61 for authenticated verified antispoofing navigation.

Referring still to FIG. 2, in an embodiment of the present technology, the ID monitoring device 68 includes a retinal scan apparatus (not shown) that uses the unique patterns on a person's retina to identify them. It is not to be confused with another ocular-based technology, iris recognition.

The human retina is a thin tissue composed of neural cells that is located in the posterior portion of the eye. Because of the complex structure of the capillaries that supply the retina with blood, each person's retina is unique. The network of blood vessels in the retina is so complex that even identical twins do not share a similar pattern.

Although retinal patterns may be altered in cases of diabetes, glaucoma or retinal degenerative disorders, the retina typically remains unchanged from birth until death.

Due to its unique and unchanging nature, the retina appears to be the most precise and reliable biometric. Advocates of retinal scanning have concluded that it is so accurate that its error rate is estimated to be only one in a million.

A biometric identifier known as a retinal scan is used to map the unique patterns of a person's retina. The blood vessels within the retina absorb light more readily than the surrounding tissue and are easily identified with appropriate lighting. A retinal scan is performed by casting an unperceived beam of low-energy infrared light into a person's eye as they look through the scanner's eyepiece. This beam of light traces a standardized path on the retina. Because retinal blood vessels are more absorbent of this light than the rest of the eye, the amount of reflection varies during the scan. The pattern of variations is converted to computer code and stored in a database.

In an embodiment of the present technology, the retinal scans apparatus (not shown) inputs images of patterns on a person's retina into the driver's authentication navigation processor 83.

In an embodiment of the present technology, the obtained patterns on a person's retina can be checked against the relevant database 94 to make sure that the driver has no criminal record, if the criminal record is relevant for the purposes of using the apparatus 61.

For example, retinal scanning has been utilized by several government agencies including the FBI, CIA, and NASA. Retinal scanning has been used in prisons, for ATM identity verification and the prevention of welfare fraud.

In an embodiment of the present technology, retinal scanning also can be used to check the medical history of the driver of the mobile platform 62 if the medical history is relevant for the purposes of using the apparatus 61. For example, if a driver of the mobile platform 62 has tuberculosis he should be prohibited from driving a passenger bus.

Referring still to FIG. 2, in an embodiment of the present technology, the ID monitoring device 68 includes a voice recognition apparatus (not shown) that uses the speaking characteristics of the voice (voice biometrics), also called voice recognition to identify the person.

Speaker recognition has a history dating back some four decades and uses the acoustic features of speech that have been found to differ between individuals. These acoustic patterns reflect both anatomy (e.g., size and shape of the throat and mouth) and learned behavioral patterns (e.g., voice pitch, speaking style). Speaker verification has earned speaker recognition its classification as a "behavioral biometric".

There are two major applications of speaker recognition technologies and methodologies. If the speaker claims to be of a certain identity and the voice is used to verify this claim, this is called verification or authentication. On the other hand, identification is the task of determining an unknown speaker's identity.

The speaker verification is a 1:1 match where one speaker's voice is matched to one template (also called a "voice print" or "voice model") whereas the speaker identification is a 1:N match where the voice is compared against N templates.

Each speaker recognition system has two phases: Enrollment and verification. During enrollment, the speaker's voice is recorded and typically a number of features are extracted to form a voice print, template, or model. In the verification phase, a speech sample or "utterance" is compared against a previously created voice print. For identification systems, the utterance is compared against multiple voice prints in order to determine the best match while verification systems compare an utterance against a single voice print. Because of the process involved, verification is faster than identification.

Speaker recognition systems fall into two categories: text-dependent and text-independent. If the text must be the same for enrollment and verification this is called text-dependent recognition. In a text-dependent system, prompts can either be common across all speakers (e.g.: a common pass phrase) or unique. In addition, the use of shared-secrets (e.g.: passwords and PINs) or knowledge-based information can be employed in order to create a multi-factor authentication scenario.

Text-independent systems are most often used for speaker identification as they require very little if any cooperation by the speaker. In this case the text during enrollment and test is different. In fact, the enrollment may happen without the user's knowledge, as in the case for many forensic applications. As text-independent technologies do not compare what was said at enrollment and verification, verification applications tend to also employ speech recognition to determine what the user is saying at the point of authentication. In text independent systems both acoustics and speech analysis techniques are used.

The various technologies used to process and store voice prints include frequency estimation, hidden Markov models, Gaussian mixture models, pattern matching algorithms, neural networks, matrix representation, Vector Quantization and decision trees. Some systems also use "anti-speaker" techniques, such as cohort models, and world models.

Ambient noise levels can impede both collections of the initial and subsequent voice samples. Noise reduction algorithms can be employed to improve accuracy, but incorrect application can have the opposite effect.

Performance degradation can result from changes in behavioral attributes of the voice and from enrolment using one telephone and verification on another telephone (cross channel). Integration with two-factor authentication products is expected to increase. Voice changes due to ageing may impact system performance over time. Some systems adapt the speaker models after every successful verification to capture such long-term changes in the voice, though there is debate regarding the overall security impact imposed by automated adaptation.

Referring still to FIG. 2, in an embodiment of the present technology, the ID monitoring device 68 includes a tachograph (not shown). A tachograph is a device fitted to a vehicle that automatically records its speed and distance, together with the driver's activity selected from a choice of modes. The drive mode is activated automatically when the vehicle is in motion, and modern tachograph heads usually default to the other work mode upon coming to rest. The rest and availability modes can be manually selected by the driver whilst stationary.

A tachograph system comprises a sender unit mounted to the vehicle gearbox, the tachograph head and a recording medium. Tachograph heads are of either analogue or digital types. All relevant vehicles manufactured since 1 May 2006 must be fitted with digital tachograph heads. The recording medium for analogue heads are wax coated paper discs, and for digital heads are digital driver cards containing a microchip with flash memory. Digital driver cards store data as a .ddd file that can be imported into tachograph analysis software. Drivers are legally required to accurately record their activities, retain the records and produce them on demand to transport authorities who are charged with enforcing regulations governing drivers' working hours.

They are also used in the maritime world. Rules for this in Germany are made by the Central Commission for Navigation on the Rhine.

Referring still to FIG. 2, in an embodiment of the present technology, if the ID monitoring device 68 includes a tachograph (not shown), the driver authentication navigation processor 83 is configured to provide the driving and rest times of the driver of the mobile platform 62 to relevant authorities 96.

Indeed, within the European Union, EU Regulation 561/2006 is the current regulation concerning the driving times, breaks and rest periods required to be taken by drivers of goods or passenger vehicles who drive in the EU. In certain circumstances, drivers may be exempt from EU Regulation 561/2006 throughout the EU, or there may be derogation for the driver on a national journey within a particular country.

If the vehicle has passed through an AETR signatory country during the course of its journey then it will fall within scope of AETR rules for the whole of that journey. Since September 2010, AETR rules have been amended to align closely with EU Regulation 561/2006. Under certain circumstances, drivers may instead fall within scope of the domestic rules of that country.

In addition to the above requirements, drivers in the EU must also abide with the European Working Time Directive 2003/88/EC.

Figure 3:
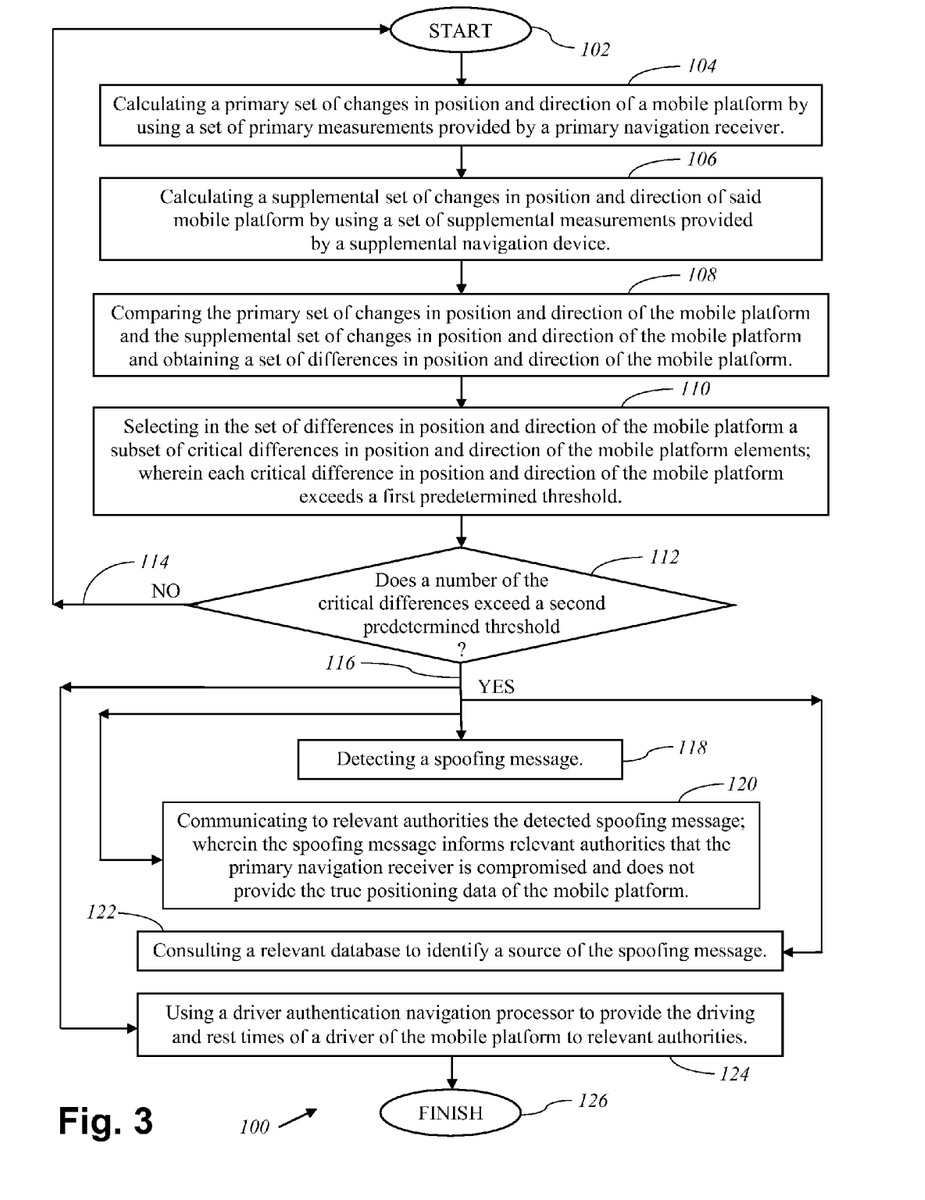
FIG. 3 is a flow chart of the method of the present technology for verified antispoofing navigation.

As shown in the flow chart 100 of FIG. 3, in an embodiment of the present technology, in operation, the apparatus 14 for verified antispoofing navigation performed the following general steps by using the algorithm 32.

In an embodiment of the present technology, at step 104, a primary set of changes in position and direction of the mobile platform 12 is calculated by using the set of primary measurements 24 provided by the primary navigation receiver 20.

In an embodiment of the present technology, at step 106, a supplemental set of changes in position and direction of the mobile platform 12 is calculated by using the set of supplemental measurements 26 provided by the supplemental navigation device 22.

In an embodiment of the present technology, at step 108, the primary set of changes in position and direction of the mobile platform 12 and the supplemental set of changes in position and direction of the mobile platform 12; are compared, and a set of differences in position and direction of the mobile platform 12 are obtained.

In an embodiment of the present technology, at step 110, a subset of critical differences in position and direction of the mobile platform elements is selected from the set of differences in position and direction of the mobile platform 12; wherein each critical difference in position and direction of the mobile platform exceeds a first predetermined threshold. The first predetermined threshold is application-specific and can be provided by the relevant authorities 42 and pre-installed in the algorithm 32 for each specific application.

In an embodiment of the present technology, if the test condition 112 is satisfied (logical arrow 116), that is if the number of the critical differences exceeds a second predetermined threshold (that is also determined by authorities 42 depending on a specific application, as was discussed above); a spoofing message is detected (step 118).

In an embodiment of the present technology, at step 120, the detected spoofing message 38 is communicated to relevant authorities 42. The spoofing message 38 informs relevant authorities that the primary navigation receiver 20 is compromised and does not provide the true positioning data of the mobile platform 12.

In an embodiment of the present technology, at step 122, the detected spoofing message 38 can be sent to the relevant database 44 in an attempt to identify the source of the spoofing message.

The flow chart 100 of FIG. 3 (steps 104-122), in an embodiment of the present technology, partially also describes the operation of the apparatus 61 for verified antispoofing navigation (without the authentication of the identity of a driver).

Additional step 124 of the flow chart 100 of FIG. 3 describes the step of authentication the driver by using the ID monitoring device 68 (of FIG. 2) and by using the driver authentication navigation processor 83 (as was disclosed above).

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote non-transitory computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for verified antispoofing navigation comprising:
a primary navigation radio receiver mounted on a mobile platform; said primary navigation radio receiver configured to provide a set of primary measurements related to position and direction of said mobile platform;

a supplemental sensory navigation device mounted on said mobile platform; said supplemental sensory navigation device configured to provide a set of supplemental measurements related to position and direction of said mobile platform; and a verification navigation circuit mounted on said mobile platform; said verification navigation circuit configured to verify authenticity of said set of primary measurements provided by said primary navigation radio receiver by comparing a first set of changes in position and direction of the mobile platform with a second set of changes in position and direction, wherein the first set of changes is calculated based on the primary measurements and the second set of changes is calculated based on the secondary measurements.

2. The apparatus of claim 1; wherein said primary navigation radio receiver is selected from the group consisting of:

a Galileo navigation receiver; a GPS navigation receiver: a GLONASS navigation receiver; a Compass navigation receiver; a Quasi-Zenith Satellite System (QZSS) navigation receiver; a combined multi-satellite navigation receiver; and a pseudolite navigation receiver.

3. The apparatus of claim 2; wherein said GPS navigation receiver is selected from the group consisting of:

an autonomous GPS satellite navigation receiver; a differential GPS satellite navigation receiver; and an RTK GPS satellite navigation receiver.

4. The apparatus of claim 2; wherein said Galileo receiver comprises:

a Galileo Commercial Services (Galileo CS) E6 frequency signals satellite navigation receiver configured to receive Galileo Commercial Services (Galileo CS) E6 frequency signals.

5. The apparatus of claim 1; wherein said supplemental sensory navigation device is selected from the group consisting of:

an Inertial Navigation System receiver; an accelerometer-based navigation receiver; a magnetometer-based navigation receiver; a cell phone-based navigation receiver; a Distance Measurement Instrument comprising an Internal Rim DMI sensor; and a wheel rotating sensor.

6. The apparatus of claim 1; wherein said verification navigation circuit is further configured to combine said set of primary measurements provided by said primary navigation radio receiver and said set of supplemental measurements provided by said supplemental sensory navigation receiver device in a blended solution to provide an output combined positioning signal related to positioning of said mobile platform.

7. The apparatus of claim 1; wherein said verification navigation circuit is further configured to run an integrity process comprising at least the following steps:

(A) calculating a primary set of changes in position and direction of said mobile platform by using said set of primary measurements provided by said primary navigation radio receiver;

(B) calculating a supplemental set of changes in position and direction of said mobile platform by using said set of supplemental measurements provided by said supplemental sensory navigation device;

(C) comparing said primary set of changes in position and direction of said mobile platform and said supplemental set of changes in position and direction of said mobile platform and obtaining a set of differences in position and direction of said mobile platform;

(D) selecting in said set of differences in position and direction of said mobile platform a subset of critical differences in position and direction of said mobile platform elements; wherein each said critical difference in position and direction of said mobile platform exceeds a first predetermined threshold;

(E) if number of said critical differences exceeds a second predetermined threshold, detecting a spoofing message; and (F) communicating to relevant authorities said detected spoofing message;

wherein said spoofing message informs relevant authorities that said primary navigation radio receiver is compromised and does not provide the true positioning data of said mobile platform.

8. An apparatus for authenticated verified antispoofing navigation comprising:

a primary navigation radio receiver mounted on a mobile platform; said primary navigation radio receiver configured to provide a set of primary measurements related to positioning and direction of said mobile platform;

a supplemental sensory navigation device mounted on said mobile platform; said supplemental navigation receiver configured to provide a set of supplemental measurements related to positioning and direction of said mobile platform;

an identity monitoring device configured to verify an identity of a driver of said mobile platform;

a verification and authentication navigation system mounted on said mobile platform, the verification and authentication navigation system further comprising:

a verification navigation circuit configured to verify authenticity of said set of primary measurements provided by said primary navigation radio receiver by using said set of supplemental measurements provided by said supplemental sensory navigation device; and a driver authentication navigation circuit configured to provide the driving and rest times of said driver to relevant authorities.

9. The apparatus of claim 8; wherein said primary navigation radio receiver is selected from the group consisting of:

a Galileo navigation receiver; a GPS navigation receiver: a GLONASS navigation receiver; a Compass navigation receiver; a Quasi-Zenith Satellite System (QZSS) navigation receiver; a combined multi-satellite navigation receiver; and a pseudolite navigation receiver.

10. The apparatus of claim 9; wherein said GPS navigation receiver is selected from the group consisting of:

an autonomous GPS satellite navigation receiver; a differential GPS satellite navigation receiver; and an RTK GPS satellite navigation receiver.

11. The apparatus of claim 9; wherein said Galileo receiver comprises:

a Galileo Commercial Services (Galileo CS) E6 frequency signals satellite navigation receiver configured to receive Galileo Commercial Services (Galileo CS) E6 frequency signals.

12. The apparatus of claim 8; wherein said supplemental sensory navigation device is selected from the group consisting of:

an Inertial Navigation System receiver; an accelerometer-based navigation receiver; a magnetometer-based navigation receiver; a cell phone-based navigation receiver;

a Distance Measurement Instrument comprising an Internal Rim DMI sensor; and a wheel rotating sensor.

13. The apparatus of claim 8; wherein said verification navigation circuit is further configured to combine said set of primary measurements provided by said primary navigation radio receiver and said set of supplemental measurements provided by said supplemental sensory navigation device in a blended solution to provide an output combined positioning signal related to positioning of said mobile platform.

14. The apparatus of claim 8; wherein said identity monitoring device is configured to verify an identity of a driver of said mobile platform by using a plurality of id parameters selected from the group consisting of:
  a set of fingerprints; a set of eye scans; a photo identification; and a voice identification.

15. The apparatus of claim 8; wherein said verification navigation circuit is further configured to run an integrity process comprising at least the following steps:
  (A) calculating a primary set of changes in position and direction of said mobile platform by using said set of primary measurements provided by said primary navigation radio receiver;
  (B) calculating a supplemental set of changes in position and direction of said mobile platform by using said set of supplemental measurements provided by said supplemental sensory navigation device;
  (C) comparing said primary set of changes in position and direction of said mobile platform and said supplemental set of changes in position and direction of said mobile platform and obtaining a set of differences in position and direction of said mobile platform;
  (D) selecting in said set of differences in position and direction of said mobile platform a subset of critical differences in position and direction of said mobile platform elements; wherein each said critical difference in position and direction of said mobile platform exceeds a first predetermined threshold;
  (E) if number of said critical differences exceeds a second predetermined threshold, detecting and recording a spoofing message;
  and
  (F) communicating to relevant authorities that said primary navigation radio receiver is compromised and does not provide the true positioning data of said mobile platform.

16. The apparatus of claim 8; wherein said driver authentication navigation circuit configured to provide the driving and rest times of said driver to relevant authorities further comprises:
  a tachograph.

17. A method of verified antispoofing navigation comprising:
  (A) calculating a primary set of changes in position and direction of a mobile platform by using a set of primary measurements provided by a primary navigation radio receiver;
  (B) calculating a supplemental set of changes in position and direction of said mobile platform by using a set of supplemental measurements provided by a supplemental sensory navigation device;
  (C) comparing said primary set of changes in position and direction of said mobile platform and said supplemental set of changes in position and direction of said mobile platform and obtaining a set of differences in position and direction of said mobile platform;
  (D) selecting in said set of differences in position and direction of said mobile platform a subset of critical differences in position and direction of said mobile platform elements, wherein each said critical difference in position and direction of said mobile platform exceeds a first predetermined threshold;
  (E) if a number of said critical differences exceeds a second predetermined threshold, detecting a spoofing message;
  and
  (F) communicating to relevant authorities said detected spoofing message;
wherein said spoofing message informs relevant authorities that said primary navigation radio receiver is compromised and does not provide the true positioning data of said mobile platform.

18. The method of claim 17 further comprising:
  (G) consulting a relevant database to identify a source of said spoofing message.

19. The method of claim 17 further comprising:
  (H) using a driver authentication navigation circuit to provide the driving and rest times of a driver of said mobile platform to relevant authorities.

* * * * *